(No Model.)  2 Sheets—Sheet 2.
T. S. MILLER.
CONVEYING APPARATUS.
No. 503,381. Patented Aug. 15, 1893.
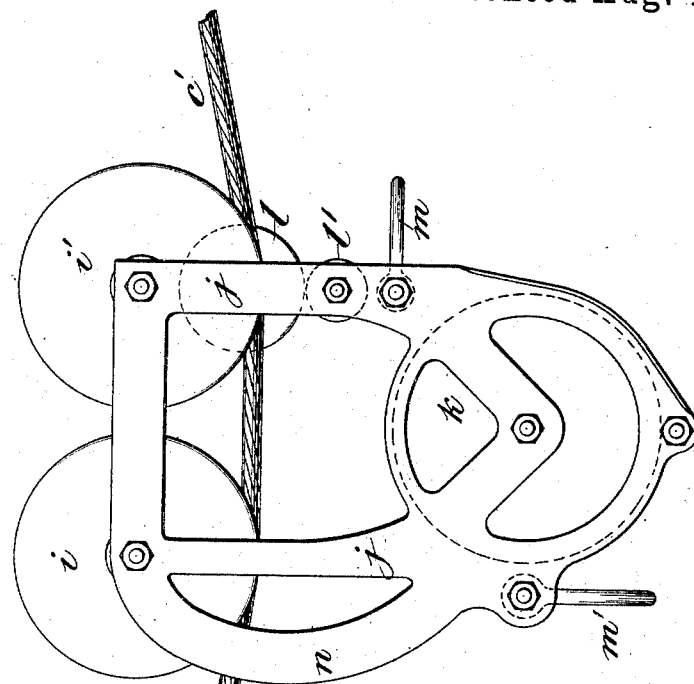
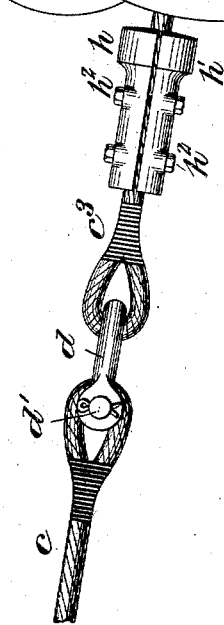
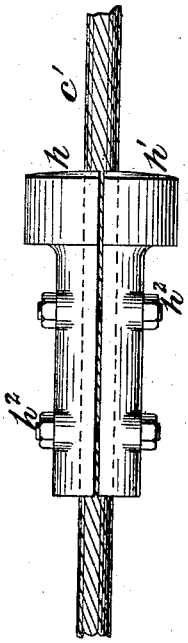
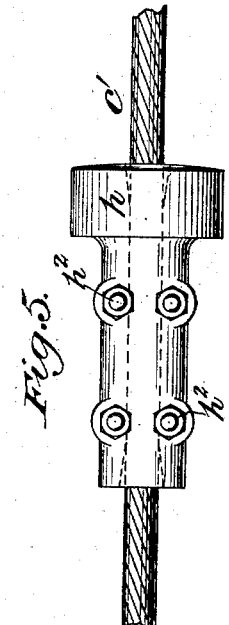
Witnesses:—
D. N. Hayward
Fred S. Kemper
Inventor:—
Thos. S. Miller
by his attorneys
Gifford & Co.

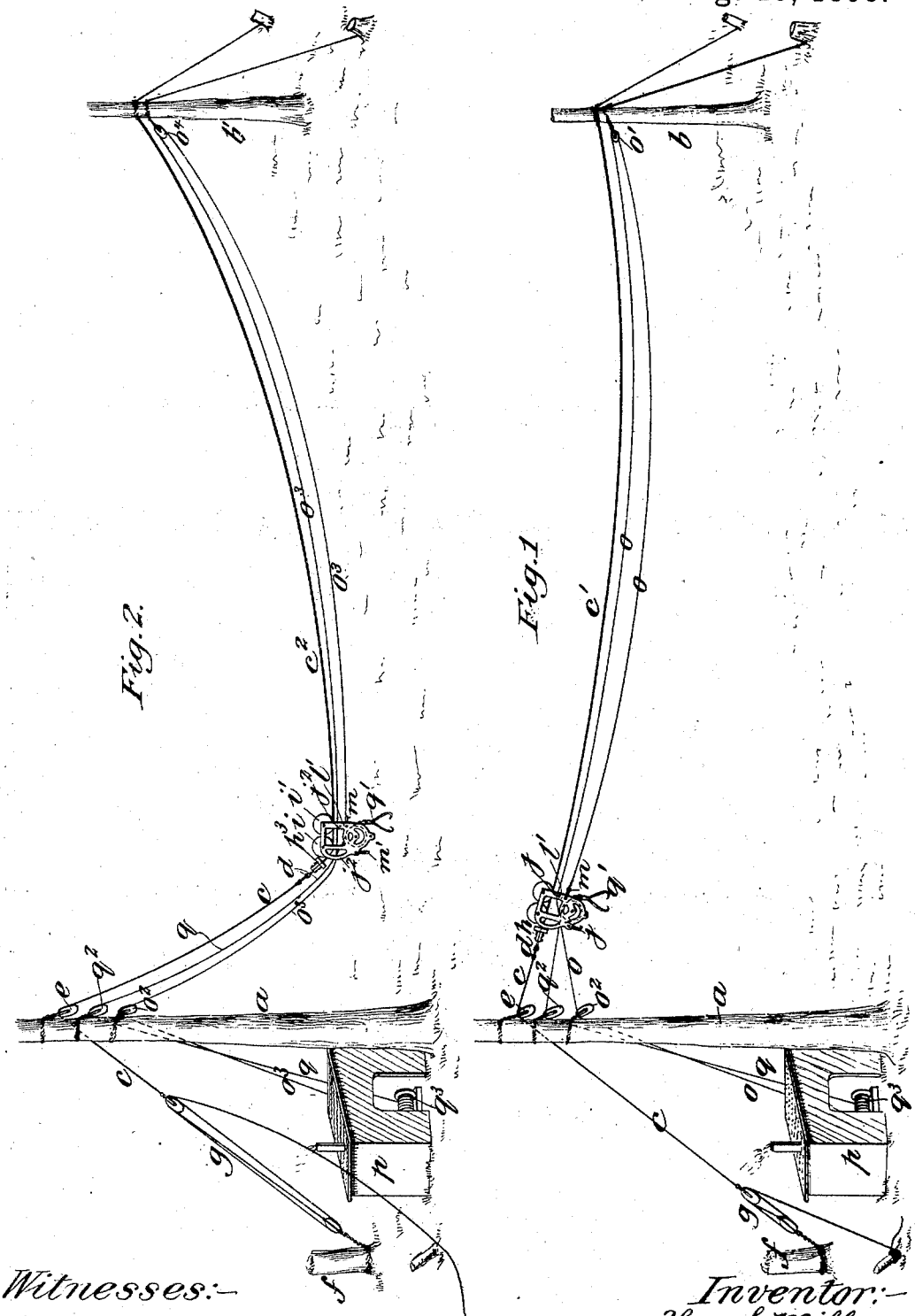

UNITED STATES PATENT OFFICE.

THOMAS SPENCER MILLER, OF SOUTH ORANGE, NEW JERSEY.

CONVEYING APPARATUS.

SPECIFICATION forming part of Letters Patent No. 503,381, dated August 15, 1893.

Application filed April 27, 1893. Serial No. 472,145. (No model.)

*To all whom it may concern:*

Be it known that I, THOMAS SPENCER MILLER, of South Orange, in the State of New Jersey, have invented a new and useful Improvement in Conveying Apparatus, of which the following is a specification.

In Letters Patent No. 288,306, dated November 13, 1883, to Horace Butler is described a conveying apparatus applied to log skidding.

My invention consists in certain improvements whereby the utility of such apparatus is greatly enlarged.

In the accompanying drawings, Figure 1 shows the apparatus in condition for use. Fig. 2 shows the same shifted to a different tail tree and with the cable slack. Fig. 3 is a side view of the carriage. Figs. 4 and 5 are two views of the stop.

$a$ is the head tree or mast; $b$ the tail tree or mast.

The cable is composed of two parts $c$ and $c'$ connected together by the shackle $d$. The tail end of the cable part $c'$ is fixed to the tail-tree $b$. The head end of the cable $c$ passes over the pulley $e$ and is connected with a stump or post $f$ by the tackle $g$. A stop composed of two parts $h\ h'$ is clamped upon the cable part $c'$ near its head end, by the bolts $h^2$ arranged as shown in Figs. 5 and 6. The wheels $i\ i'$ running upon the cable part $c'$ carry the carriage-frame $j$ in the lower portion of which is mounted the sheave $k$. $l\ l'$ are guide sheaves for the outhaul rope also mounted upon the frame $j$.

$m$ is a clevis on the frame $j$ to which the end of the outhaul rope is connected and $m'$ is another clevis to which the end of an inhaul rope may be connected, if desired.

$n$ is a projection on the frame $j$ in such position that as the carriage approaches the head tree, this projection will strike against the stop $h\ h'$ in advance of the wheel $i$.

$o$ is the outhaul rope which, having its end secured to the clevis $m$, extends around the pulley $o'$ fixed to the tail tree, thence back between the guide wheels $l$ and $l'$ and over the pulley $o^2$ on the head tree to a drum in the engine-house $p$.

$q$ is a hoisting rope to the end of which is secured the logging tongs $q'$ and which extends over the sheave $k$ on the carriage, thence over the pulley $q^2$ on the head tree and down to the rope drum $q^3$ in the engine-house. When the cable is in working position, as shown in Fig. 1, the carriage is hauled toward the tail tree by the outhaul rope $o$, then the logging tongs are lowered by the hoisting rope $q$ and made fast to a log; then by hauling in on the hoisting rope, the log is partially lifted and dragged toward the head tree while the outhaul rope is paid out. When the projection $n$ strikes against the stop $h\ h'$ the farther inward movement of the carriage is prevented; and by paying out on the hoisting rope, the logs are deposited on the ground in proper position to be conveniently loaded upon the cars.

The combination with the apparatus of the clamp stop $h\ h'$ introduces several features of utility that may be availed of: It enables the point at which the logs are deposited by the hauling apparatus to be uniformly where they are required for convenient handling by the loading apparatus; it relieves the outhaul rope from the strain of holding as the logs are being lowered; it guards splice $c^3$ in the main cable so that it need not be worn by contact with the carriage. It also performs the following very important function: Suppose the apparatus has been used in one position till it can reach no more logs. Now without changing the head tree, the tail rope is to be changed. To do this the main cable is slackened by loosening the tackle $g$. The cable part $c'$ is then detached from the cable part $c$ at the coupling by removing the coupling bolt $d'$. Then the outhaul rope $o$ is detached from its drum and from the pulley $o^2$. Then the logging tongs $q'$ are detached from the hoisting-rope $q$ and the latter detached from the carriage. Then another cable part $c^2$ (Fig. 2) which has already been secured to the new tail tree $b'$ and which carries a new stop $h^3$ and new carriage $j^2$ is connected with the cable part $c$. Then the hoisting rope $q$ is passed over the sheave of the new carriage and the logging tongs are secured to the end of it. Then a new outhaul rope $o^3$ connected with the new carriage, passing through a pulley $o^4$ on the new tail tree, is drawn between the guide wheels on the carriage, thence through the pulley $o^2$ on the head tree and connected with the outhaul winding drum in the engine-house $p$. The engine is now started to wind in on the hoisting rope which brings the carriage against the stop and draws the main cable taut. The slack is taken in by the tackle $g$ and secured, and the carriage and cable are thus with little manual labor put so quickly into condition for use that by having duplicate carriages and outhaul ropes and parts of the main cable to be secured to the tail tree to be ready when required, the field of operation of the apparatus may be shifted in a few minutes.

Although I have described my invention as applied to a log skidding apparatus, I do not wish to limit myself to that application because it may be applied to conveying apparatus for other purposes.

I claim—

1. In a conveying apparatus in combination, a cable, a carriage, a clamp stop on the cable adapted to arrest the travel of the carriage, a rope drum, a rope extending from said drum to the carriage, whereby the cable may be drawn taut by said rope acting through the carriage against said stop, substantially as described.

2. In a conveying apparatus in combination a cable part $c$, a cable part $c'$, a coupling, a carriage, a clamp stop on the cable part $c'$ adapted to arrest the travel of the carriage, a rope drum, a rope extending from said drum to the carriage, whereby the cable part $c'$ may be drawn taut by said rope acting through the carriage against said stop, substantially as described.

THOS. SPENCER MILLER.

Witnesses:
J. E. GREER,
FRED S. KEMPER.